US008644868B2

(12) United States Patent
Gossain et al.

(10) Patent No.: US 8,644,868 B2
(45) Date of Patent: *Feb. 4, 2014

(54) SYSTEM AND METHOD FOR MANAGING SPECTRUM ALLOCATION

(75) Inventors: Hrishikesh Gossain, Heathrow, FL (US); Manish Shukla, Altamonte Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/041,629

(22) Filed: Mar. 7, 2011

(65) Prior Publication Data

US 2012/0231825 A1 Sep. 13, 2012

(51) Int. Cl.
*H04W 72/00* (2009.01)
*H04W 74/00* (2009.01)
*H04B 7/00* (2006.01)

(52) U.S. Cl.
USPC ........ 455/509; 455/450; 455/452.1; 455/453; 455/455

(58) Field of Classification Search
USPC .................... 455/450, 452.1, 452.2, 453, 509
See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 6,954,171 B2 | 10/2005 | Husted et al. | |
| 7,460,837 B2 | 12/2008 | Diener | |
| 8,160,599 B2 * | 4/2012 | Stanforth et al. | 455/450 |
| 8,233,928 B2 * | 7/2012 | Stanforth et al. | 455/509 |
| 2004/0028003 A1 | 2/2004 | Diener et al. | |
| 2004/0087310 A1 | 5/2004 | Williamson et al. | |
| 2006/0031082 A1 | 2/2006 | Amaitis et al. | |
| 2006/0083205 A1 * | 4/2006 | Buddhikot et al. | 370/338 |
| 2006/0143111 A1 | 6/2006 | Mylet | |
| 2006/0182169 A1 | 8/2006 | Belge et al. | |
| 2006/0217166 A1 | 9/2006 | Swanson | |
| 2006/0218392 A1 * | 9/2006 | Johnston | 713/156 |
| 2006/0262768 A1 | 11/2006 | Putzolu | |
| 2007/0274404 A1 | 11/2007 | Papandriopoulos et al. | |
| 2008/0101447 A1 | 5/2008 | Li et al. | |
| 2008/0108365 A1 | 5/2008 | Buddhikot et al. | |
| 2008/0159208 A1 | 7/2008 | Kloker et al. | |

(Continued)

OTHER PUBLICATIONS

International Search Report and Written Opinion from corresponding International Application No. PCT/US2012/024826, mailed on Jun. 14, 2012.

(Continued)

*Primary Examiner* — Tilahun B Gesesse
(74) *Attorney, Agent, or Firm* — Renner, Otto, Boisselle & Sklar, LLP

(57) ABSTRACT

A wireless radio device includes a wireless transceiver configured to receive on a first channel set and transmit on a second channel set and a control circuit. The control circuit determines one or more available channels for transmission and selects one or more channels for the second channel set from the channels available for transmission. The control circuit also determines one or more available channels for reception, the one or more available channels for reception including the one or more available channels for transmission and one or more channels that are not available for transmission due to operation of an incumbent radio device in a location of the radio device; and selects one or more channels for the first channel set from the channels available for reception.

25 Claims, 4 Drawing Sheets

(56) References Cited

U.S. PATENT DOCUMENTS

| | | | |
|---|---|---|---|
| 2008/0186882 A1 | 8/2008 | Scherzer et al. | |
| 2008/0221951 A1* | 9/2008 | Stanforth et al. | 705/7 |
| 2008/0222019 A1* | 9/2008 | Stanforth et al. | 705/37 |
| 2008/0222021 A1 | 9/2008 | Stanforth et al. | |
| 2009/0046625 A1 | 2/2009 | Diener et al. | |
| 2009/0197627 A1 | 8/2009 | Kuffner et al. | |
| 2009/0274073 A1 | 11/2009 | Sutton | |
| 2010/0261423 A1* | 10/2010 | Stanforth et al. | 455/3.01 |
| 2011/0250915 A1* | 10/2011 | Stanforth et al. | 455/509 |
| 2012/0165056 A1* | 6/2012 | Kim et al. | 455/509 |
| 2012/0258753 A1* | 10/2012 | Stanforth et al. | 455/509 |
| 2012/0322487 A1* | 12/2012 | Stanforth | 455/509 |

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FC 04-167, pp. 1-180.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

Jones, Steven K. et al., "Initial Evaluation of the Performance of Prototype TV-Band White Space Devices", (2007), OET Report, FCC/OET 07-TR-1006.

\* cited by examiner

SYSTEM AND METHOD FOR MANAGING SPECTRUM ALLOCATION

TECHNICAL FIELD OF THE INVENTION

The technology of the present disclosure relates generally to wireless communications infrastructure and, more particularly, to a system and method for managing spectrum allocation for spectrum that is used to support wireless communications.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties.

In the U.S., some spectrum may be used without a license, but regulations on the spectrum may be imposed. For example, the FCC has eliminated analog television (TV) broadcasts in favor of digital TV broadcasts. This switch freed up spectrum channels for use by unlicensed radio systems to offer various services, such as mobile communications and Internet access. This freed spectrum is commonly referred to as TV whitespaces. In the case of TV whitespaces, the whitespaces is comprised of unused TV spectrum between channel 2 and channel 51 (corresponding to 54 MHz to 698 MHz). To avoid interference with digital TV broadcasts and other incumbent systems, such as wireless microphone systems, radios that use the TV whitespaces will be required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV whitespaces may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

SUMMARY

Although the FCC has identified parameters for the use of TV whitespaces, there is room for improvement in the manner in which corresponding spectrum is allocated among radio systems.

According to one aspect of the disclosure, a wireless radio device includes a wireless transceiver configured to receive on a first channel set and transmit on a second channel set; and a control circuit configured to: determine one or more available channels for transmission; select one or more channels for the second channel set from the channels available for transmission, the one or more channels for the second channel set being operational channels for an uplink of the radio device; determine one or more available channels for reception, the one or more available channels for reception including the one or more available channels for transmission and one or more channels that are not available for transmission due to operation of an incumbent radio device in a location of the radio device; and select one or more channels for the first channel set from the channels available for reception, the one or more channels for the first channel set being operational channels for a downlink of the radio device.

According to one embodiment of the radio device, the first channel set and the second channel set have at least one channel in common.

According to one embodiment of the radio device, the one or more channels for the first and second channel sets are selected so that a receive bandwidth mode of the radio device has a bandwidth that is larger than a bandwidth of a transmit bandwidth mode of the radio device.

According to one embodiment of the radio device, the control circuit is further configured to select a primary channel that is in both the first and second channel sets.

According to one embodiment of the radio device, the radio device is configured to communicate the operational channels for the uplink and downlink to another radio device.

According to one embodiment of the radio device, the operational channels are communicated during a link set up for communications with the another radio device.

According to one embodiment of the radio device, the operational channels are communicated in a beacon transmitted by the radio device.

According to one embodiment of the radio device, determination of the one or more available channels for transmission and the one or more available channels for reception is carried out by transmission of a registration request to a registration system and reception of a spectrum certificate with a channel map of available channels for wireless communications from the registration system.

According to one embodiment of the radio device, the control circuit is configured to analyze the spectrum certificate to select the one or more channels for the first and second channel sets.

According to one embodiment of the radio device, the channel map contains a channel map of available channels without distinction between receive and transmit operations.

According to one embodiment of the radio device, the spectrum certificate contains one channel map of available channels for transmit and another channel map of available channels for reception.

According to one embodiment of the radio device, the radio device is configured to communicate the operational channels for the uplink and the downlink to the registration system.

According to another aspect of the disclosure, a method of configuring a wireless radio device that has a wireless transceiver configured to receive on a first channel set and transmit on a second channel set includes determining one or more available channels for transmission; selecting one or more channels for the second channel set from the channels available for transmission, the one or more channels for the second channel set being operational channels for an uplink of the radio device; determining one or more available channels for reception, the one or more available channels for reception including the one or more available channels for transmission and one or more channels that are not available for transmission due to operation of an incumbent radio device in a location of the radio device; and selecting one or more channels for the first channel set from the channels available for reception, the one or more channels for the first channel set being operational channels for a downlink of the radio device.

According to one embodiment of the method, the first channel set and the second channel set have at least one channel in common.

According to one embodiment of the method, the one or more channels for the first and second channel sets are selected so that a receive bandwidth mode of the radio device has a bandwidth that is larger than a bandwidth of a transmit bandwidth mode of the radio device.

According to one embodiment, the method further includes selecting a primary channel that is in both the first and second channel sets.

According to one embodiment, the method further includes communicating the operational channels for the uplink and downlink to another radio device.

According to one embodiment of the method, the operational channels are communicated during a link set up for communications with the another radio device.

According to one embodiment of the method, the operational channels are communicated in a beacon transmitted by the radio device.

According to one embodiment of the method, determination of the one or more available channels for transmission and the one or more available channels for reception is carried out by transmitting a registration request to a registration system and receiving a spectrum certificate with a channel map of available channels for wireless communications from the registration system.

According to one embodiment, the method further includes analyzing the spectrum certificate to select the one or more channels for the first and second channel sets.

According to one embodiment of the method, the channel map contains a channel map of available channels without distinction between receive and transmit operations.

According to one embodiment of the method, the spectrum certificate contains one channel map of available channels for transmit and another channel map of available channels for reception.

According to one embodiment, the method further includes communicating the operational channels for the uplink and the downlink to the registration system.

According to another aspect of the disclosure, a registration system for radio systems that use spectrum that is interleaved with spectrum used by incumbent radio systems includes an interface to communicate with the radio systems over a network; and a processor that executes a spectrum allocation function that is stored in a memory and, by execution of the spectrum allocation function, the registration system configured to: receive a registration request from a requesting radio device; and generate a spectrum certificate for the requesting radio device, the spectrum certificate containing: a first channel map identifying available channels for use by the requesting radio device for transmission of radio signals to other radio devices; and a second channel map identifying available channels for use by the requesting radio device for receiving radio signals from the other radio devices, the second channel map including one or more channels that are not available for transmission due to operation of an incumbent radio device in a location of the requesting radio device.

According to one embodiment of the registration system, the registration system is further configured to select one or more channels from the channels available for transmission for the requesting radio device to use as operational channels for an uplink of the requesting radio device; and select one or more channels from the channels available for reception for the requesting radio device to use as operational channels for a downlink of the requesting radio device.

According to one embodiment of the registration system, the selected channels for the uplink and the downlink are for establishment of a peer link setup between the requesting radio device and another radio device.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
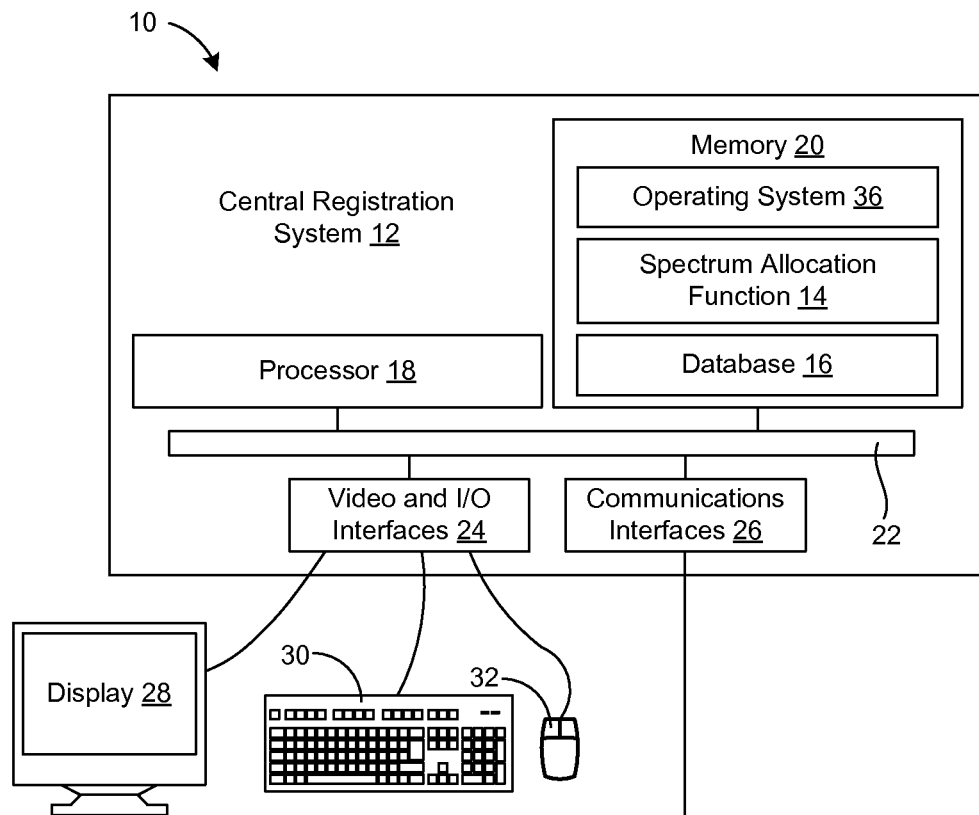
FIG. 1 is a schematic view of an exemplary system for managing spectrum allocation.
Figure 1:
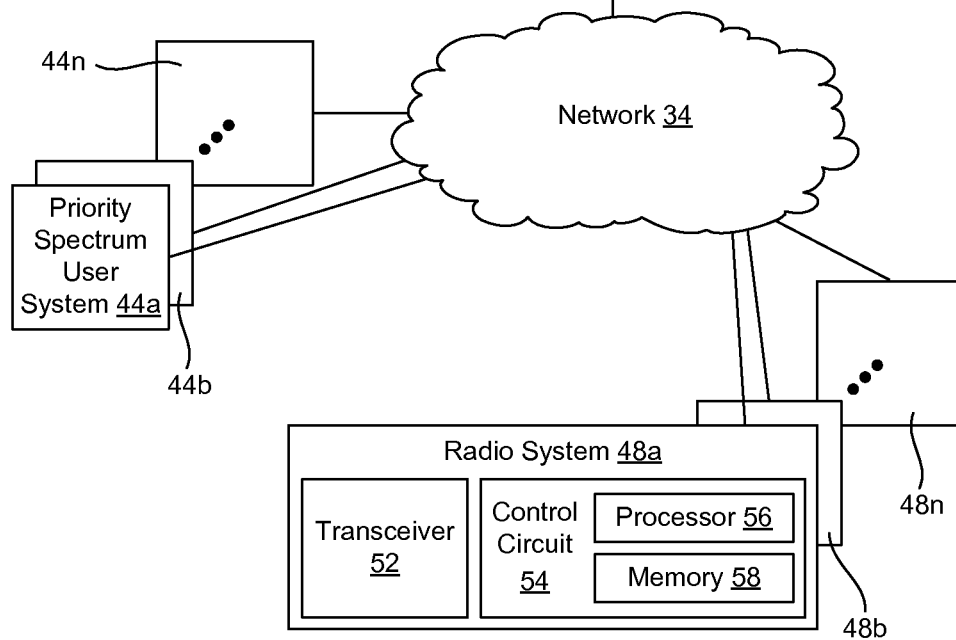

Embodiments will now be described with reference to the drawings, wherein like reference numerals are used to refer to like elements throughout. It will be understood that the figures are not necessarily to scale.

Features that are described and/or illustrated with respect to one embodiment may be used in the same way or in a similar way in one or more other embodiments and/or in combination with or instead of the features of the other embodiments.

A. Overview

A(1). Parties

In this document, described are various entities that may have a relationship to electromagnetic spectrum for use in wireless communications. One entity is a government or regulatory agency. In the United States, the governmental agency may be the FCC. The governmental agency controls the rules and/or regulations for how wireless spectrum may be used. Exemplary rules governing certain spectrum are described in the above-mentioned FCC 08-260. Another exemplary agency is Ofcom in the United Kingdom.

Another party may be incumbent spectrum users. Incumbent spectrum users may be user types that have priority to certain spectrum or have "grandfather" provisions so as to have access to certain spectrum. Exemplary incumbent users to spectrum in the TV broadcast channels are TV stations that broadcast using digital signals. Other exemplary incumbent users to spectrum in the TV broadcast channels are wireless microphone systems.

Another party may be radio systems that desire spectrum to operate, such as for offering wireless communications and Internet access to mobile client devices. With the transition of analog TV broadcasts to digital TV broadcasts, radios may seek registration in accordance with FCC 08-260 to gain access to TV whitespaces. These radios are referred to TV whitespace band radios (TVBDs).

Still another party may be an entity or system that manages registration of the various parties that use the spectrum in question. This party may carry out such management using a central registration system as described in greater detail below.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In addition, the systems and methods are described in the exemplary context of managing TV whitespaces. However, the systems and method may be applied to other circumstances where radios register for spectrum use. Radio systems with priority to the spectrum in question will be referred to as primary spectrum users or primary radio systems. In the exemplary context of TV whitespaces, primary spectrum users may be, for example, the incumbent radio systems described in this document. Radio systems that have spectrum access rights that are subservient to the primary spectrum users will be referred to as secondary spectrum users or secondary radio systems. In the exemplary context of TV whitespaces, secondary spectrum users may be, for example, the TVBDs described in this document. The secondary radio systems may use spectrum that is interleaved with spectrum used by the primary radio systems. Therefore, this document describes a registration system for secondary radio systems that use spectrum that is interleaved with spectrum used by primary radio systems and related methods, as well as secondary radio systems that use such spectrum.

B. System Architecture

With reference to FIG. 1, illustrated is a schematic block diagram of a computer-based system 10 capable of executing computer applications (e.g., software programs). The system 10 may include a central registration system 12 that is implemented using computer technology. The central registration system 12 may be configured to execute a spectrum allocation function 14 and to store a database 16 that contains data regarding spectrum information that is used by the spectrum allocation function 14.

In one embodiment, the spectrum allocation function 14 is embodied as one or more computer programs (e.g., one or more software applications including compilations of executable code). The computer program(s) and/or database 16 may be stored on a non-transitory computer readable medium, such as a magnetic, optical or electronic memory (e.g., hard disk, optical disk, flash memory, etc.).

To execute the function 14, the system 12 may include one or more processors 18 used to execute instructions that carry out a specified logic routine(s). In addition, the system 12 may have a memory 20 for storing data, logic routine instructions, computer programs, files, operating system instructions, and the like. As illustrated, the function 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The system 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the system 10 to send and receive data signals, voice signals, video signals, and the like to and from other computing devices via an external network 34 (e.g., the Internet, a wide area network (WAN), a local area network (LAN), direct data link, or similar systems). The interface between the system 12 and any operatively interfaced device or network may be wired or wireless.

The memory 20 may store an operating system 36 that is executed by the processor 18 to control the allocation and usage of resources in the system 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the function 14, depend as is generally known by those with ordinary skill in the art. The operating system 36 also may control much of the user interface environment presented to a user, such as features of the overall graphical user interface (GUI) for the system 12.

In one embodiment, the system 12 may be configured as a server that executes the function 14 to host the below-described spectrum management functions. The spectrum management functions include providing spectrum certificates to qualified radio devices so that the radio devices may make use of spectrum for wireless communications. In the illustrated example, these radio devices include one or more incumbent spectrum radio devices, such as the illustrated primary spectrum user radio systems 44a through 44n. Also, the radio devices may include one or more secondary spectrum user radio systems, such as the illustrated radio systems 48a through 48n. In the exemplary context of managing spectrum for TV whitespaces, the radio systems 48a through 48n may be TVBD radio systems. But it will be appreciated that the radio systems 48 may be other classes of radio systems. Each radio system 48 may be an individual radio device or a network of radio devices. Also, each radio system 48 may include at least one transceiver for engaging in wireless communications and a controller for managing radio system operation, including the registration and channel selection functions described below.

It is contemplated that there may be hundreds or thousands of incumbent systems and thousands or millions of secondary radio systems 48. Under current FCC procedure, TVBD radios will register every twenty-four hours. Also, for mobile TVBD radios that do not have a fixed location, the mobile TVBD radio will register each time the TVBD radio changes location. Therefore, to handle registration volume of the systems 44 and 48, the central registration system 12 may be scaled to handle a high volume of registration requests. Furthermore, the central registration system 12 may have a distributed architecture, and may include plural server systems. The systems 44 and 48 may interact with the central registration system 12 for registration purposes over the Internet using electronic messaging. Furthermore, the function 14 may be considered an expert system for generating meaningful spectrum certificates that increase the operational capacity of the corresponding spectrum and reduces interference among systems that use the spectrum.

While the registration process for at least the radio systems 48 may be fully automated, the function 14 may host an Internet-style website for the various parties to conduct initial enrollment with the system 12, conduct manual registration if needed, access various tools and reports supplied by the function 14, and so forth.

C. Spectrum Allocation

Figure 2:
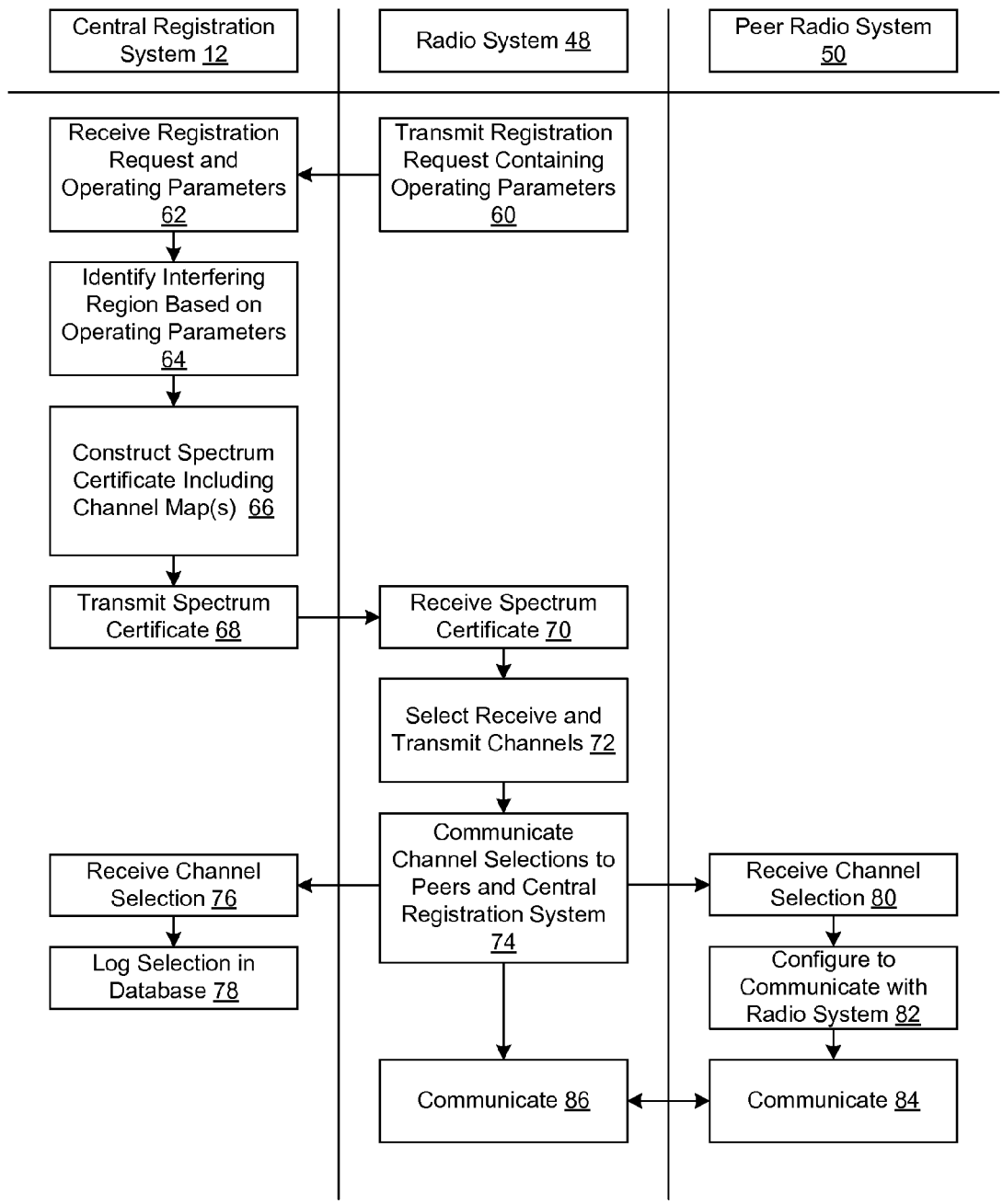
FIG. 2 is a flow diagram representing exemplary actions taken by various components of the system of FIG. 1.

With reference to FIG. 2, illustrated are logical operations to implement exemplary methods of managing spectrum. The exemplary methods may be carried out, in part, by executing an embodiment of the spectrum allocation function 14, for example. Thus, the flow diagram may be thought of as depicting steps of one or more methods carried out by the system 10. Although the flow charts show specific orders of executing functional logic blocks, the order of executing the blocks may be changed relative to the order shown. Also, two or more blocks shown in succession may be executed concurrently or with partial concurrence. The described functions may be repeated for all radio systems 48 so that appropriate spectrum certificates are provided to each qualified spectrum user.

C(2). Whitespace Band Radios

With reference to FIGS. 1 and 2, the radio system 48 may register with the central registration system 12 to receive a spectrum certificate with information relating to available channels in which the radio system 48 may operate. The available channels may not be contiguous in frequency. In one embodiment, the radio system 48 may undergo an initial enrollment by supplying various information, such as FCC identifier (FCC id), device serial number, contact information of a responsible person or entity (e.g., contact name, street and/or mailing address, electronic mail address, telephone number, etc.), device type, device configuration, device capabilities, and any other appropriate information.

The FCC id and serial number may be validated against data that is previously supplied by radio equipment manufacturers. Also, using the data from the radio equipment manufacturer or information supplied by the radio system 48, the central registration system 12 may identify characteristics of the radio system 48, such as fixed or mobile device, radio type, and so forth. If the validation process indicates that the enrollment attempt is not legitimate, an alarm may be generated that may lead to investigation concerning the radio system 48.

If the data supplied by the radio system is valid, the enrollment process may continue. For instance, the radio system 48 may be granted a temporary authorization to acquire spectrum certificates. For instance, the temporary authorization may last for a predetermined number of days, such as forty-five days. During the temporary authorization, conditions to acquire permanent authorization to acquire spectrum certificates may be completed. An exemplary condition includes payment of appropriate fees by the radio system 48, the device manufacturer, or another party. Another exemplary condition includes satisfaction of a challenge, such as the operator of the radio system 48 successfully using a link to an Internet page that is transmitted from the central registration system 12 via electronic mail.

In order to carry out the logical operations described below, the radio system 48 may include appropriate processing and memory components, and may execute a client function (e.g., an executable program stored on a non-transitory computer readable medium that embodies the described logical operations). For instance, the radio system 48 may include a wireless transceiver 52 for engaging in wireless communications and a control circuit 54 for carrying out control functionality. The control circuit 54 may include, for example, a processor 56 and a memory 58.

An exemplary registration process for the radio system 48 may commence in block 60 where the radio system 48 transmits a registration request along with operating parameters to the central registration system 12. The registration request containing operating parameters may identify the radio system 48, antenna height, information to ascertain a location of the radio system 48, and any other appropriate information. Location information may be determined in any appropriate manner. For instance, location may be determined using a triangulation method. A common triangulation method is by using a global position system (GPS) or assisted GPS (AGPS) approximation of location. Another location determination technique is to use a postal address, such as a street address or a zip code (e.g., in the United States a "zip+4" code may provide a sufficiently accurate location estimation).

Another location determining technique may involve reverse triangulation using a channel map provided by the radio system 48. For instance, the radio system 48 may identity the channels on which the radio system 48 detects (or "sees") transmission activity and corresponding signal strengths. From matching this information to known service contours of the radio devices, the central registration system 12 may estimate the location of the radio system 28. Also, the information provided by the radio system 48 represents data of actual broadcasts by other radio devices that may be used to adjust calculated contours for the corresponding incumbent systems 44 or other radio systems. In this manner, the database of used channels for the location the radio system 48 may be adjusted based on feedback from various radio systems 48.

In block 62, the registration request and operating parameters may be received by the central registration system 12. Then, in block 64, the central registration system 12 may process the registration request and operating parameters to identify an interfering region based. In one embodiment, data maintained in the database 16 may be compared to the location contained in the operating parameters to identify unavailable and available channels that the radio system 48 may use for wireless communications. The identification may include determining which channels are in use by incumbent systems 44 for the location of the radio system 48. Those channels will be considered not available at least for transmission use by the radio system 48. Unavailable channels may be considered available for reception. Alternatively, the identification may identify channels that the radio system 48 may use for transmission and separately identify channels that the radio system 48 may use for reception.

Also, the type of radio system making the request and/or the spectral mask of the radio system making the request may indicate that certain channels are unavailable. In the exemplary context of TV whitespaces, any unused channels for the location of the radio system 48 and that the radio system 48 is permitted to use based on radio type and spectral mask may be considered TV whitespaces that are available for transmission and receiving use by the radio system 48.

Then, in block 66, the central registration system 12 may construct a spectrum certificate for the requesting radio system 48. The spectrum certificate may be a data object containing a channel map that identifies channels that are available for use by the radio system 48. In one embodiment, the channel map may be a list of available channels on which the radio system 48 is allowed to transmit based on the location of the radio system 48 relative to priority spectrum user systems 44. Table 1 represents an exemplary channel map established under this technique for a situation where there are fifty channels that are numbered channels 2 through 51, and where channels 2, 3, 4, 47 and 49 are not available to the requesting radio system 48 for transmitting.

TABLE 1

| Channel Identifier | Availability |
|---|---|
| 2 | Not available |
| 3 | Not available |
| 4 | Not available |
| 5 | Available |
| 6 | Available |
| 7 | Available |
| . | . |
| . | . |
| . | . |
| 47 | Not available |
| 48 | Available |
| 49 | Not available |
| 50 | Available |
| 51 | Available |

Channels that are identified as being not available in the channel map are channels on which the radio system 48 may not transmit. But the unavailable channels may be used for reception by the radio system 48, as discussed in greater detail below.

In another embodiment, the spectrum certificate may contain two lists of channels, including a first list identifying channels on which the radio system 48 is allowed to transmit (a transmit channel map) and a second list identifying channels on which the radio system 48 is allowed to receive (a receive channel map). Table 2 represents an exemplary channel map established under this technique for a situation where there are fifty channels that are numbered channels 2 through 51, and where channels 2, 3, 4, 47 and 49 are not available to the requesting radio system 48 for transmitting. As indicated, at least some the channels that are not available to the requesting radio system 48 for transmitting may be available for receiving. In the exemplary listing of Table 2, channels 2, 3, 4, and 49 are available for receiving in addition to all of the channels that are available for transmitting. Channel 47 exemplifies a channel that is not available for transmitting or receiving. This condition may be based on knowledge of the central registration system 12 regarding the operational environment of the requesting radio device.

TABLE 2

| Channel Identifier | Transmit Availability | Receive Availability |
|---|---|---|
| 2 | Not available | Available |
| 3 | Not available | Available |
| 4 | Not available | Available |
| 5 | Available | Available |
| 6 | Available | Available |
| 7 | Available | Available |
| . | . | . |
| . | . | . |
| . | . | . |
| 47 | Not available | Not available |
| 48 | Available | Available |
| 49 | Not available | Available |
| 50 | Available | Available |
| 51 | Available | Available |

In one embodiment, information in the spectrum certificate may be used to provide more guidance to the radio system 48 beyond a binary-type value of whether a channel is available or not available for transmitting or receiving. For example, the information may be constructed in a way to steer the channel choice of the radio system 48 for transmitting and/or receiving. An exemplary reason to lead the radio system 48 to choose one channel over another channel for receiving or transmitting includes avoiding interference with operation of another radio system 48 or incumbent device 44. Another exemplary reason to lead the radio system 48 to choose one channel over another includes maximizing spectrum usage by distributing radios systems 48 among various channels.

In one embodiment, a logical map of spectrum usage for both transmitting and receiving for the location of the requesting radio system 48 may be established. Transmitting and receiving channel availability based on incumbent system use may be determined. For the available transmitting and receiving channels, each channel may be evaluated for the potential for interference with another system and/or for the efficient distribution of spectrum use. In one embodiment, the results of this analysis may be a grade, or guidance value, for each channel. The guidance value may reflect how much interference the radio system 48 may expect to encounter for the corresponding channel.

In addition to the channel map, the spectrum certificate may contain other relevant information. For example, a time at which the spectrum certificate expires may be present. At the arrival of the specified time, the radio system 48 may reregister. Following current FCC guidelines for use of TV whitespaces, the spectrum certificate may be valid for twenty-four hours. However, it is possible that there may be situations in which a spectrum certificate is valid for less than or more than twenty-four hours.

Following construction of the spectrum certificate in block 66, the spectrum certificate may be transmitted to the requesting radio system 48 in block 68. The spectrum certificate may be received by the requesting radio system 48 in block 70. Following receipt of the spectrum certificate, in block 72 the radio system 48 may select one of the available transmitting channels and select one or more receiving channels for use in connection with the wireless communications activity of the radio system 48.

Channel selection may be based on any appropriate criteria. For example, the radio system 48 may simply select one or more available channels for transmitting and receiving, and/or may select one or more available channels for transmitting and one or more available channels for receiving. In other embodiments, the radio system 48 may listen to broadcast activity on the available channels to make a "self-determination" as to which channel or channels may be relatively interference-free. Also, the radio system 48 may undertake other assessments of channel suitability. As will be understood, a radio system that is indoors may perform differently than a radio system that is outside, and a radio system that is in a canyon may perform differently than a radio system that is on top of a hill or a tall tower. Therefore, such assessments may include analyzing performance for the available channels to determine which channel or channels may be most suitable for the communications activity of the radio system 48. Also, depending on the bandwidth needs of the radio system 48, the radio system 48 may select more than one channel on which to operate. Channel selection also may be based on channels that were previously selected by devices (e.g., peer radio devices) with which the radio system 48 is interested in engaging in wireless communications.

Also, in the embodiment where the available channels are identified with a guidance value, the guidance value may be considered. In some embodiments, the guidance value may be the only criteria evaluated by the radio system. In other embodiments, the guidance value may be used as a weighting factor in combination with an interference assessment and/or a performance assessment made by the radio system. For instance, if two channels have approximately the same results for potential interference and/or performance, the channel with the higher guidance value may be selected.

Once the radio system has selected at least one channel for transmitting and at least one channel for receiving in block 72, the logical flow may proceed to block 74 where the channel selections are transmitted to the central registration system 12. In one embodiment, the radio system 48 also may transmit one or more reasons as to why the channels were selected. The reasons may include, for example, that the channels were selected by default operation, that the channels were selected based on perceived interference, that the channels were selected based on perceived performance, that the channels were selected based on a guidance value associated with the channel map, that the channels were selected for coordination with one or more other radio devices, or that the channels were selected based on a combination of factors. The reasons may be transmitted in the form of a code selected from a plurality of codes, where each code represents one or more of these factors.

The selected transmitting and receiving channels and the selection reason, if transmitted, may be received by the central registration system 12 in block 76. Then, in block 78, the channel selection and reason, if received, may be logged in the database 16 for future use. For example, the channel selections and corresponding reasons that are provided by the radio systems 48 may provide a feedback mechanism with valuable information to improve the guidance operation of the spectrum allocation function 14 when constructing future channel maps in block 66.

In one embodiment, the channel selection of a first radio system 48 may be used during the establishment of guidance values for a channel map for a second requesting radio system 48 that has a similar location to the first radio system 48. Since the channel selection information indicates that the selected channel is at least partially occupied, the corresponding guidance value for that channel for the second requesting radio system 48 may be lower than if there was no knowledge that the channel had been selected. This may guide the second requesting radio system 48 toward selection of a different channel than was selected by the first radio system 48, thereby reducing the possibility of interference and distributing wireless communication across plural channels.

In one embodiment, the channel selection and/or reason may be used to assess if prior guidance values were more lenient or more conservative than actual conditions warranted. Future guidance value generation then may be adjusted to better serve the radio systems 48. Also, the channel selection and/or reason may be used to learn channel selections that are made by specific radio systems 48 to optimize performance. Learned channel selection behavior then may be used in the future to elevate the guidance value for the optimal channel(s) for the corresponding radio system 48 in the future.

In addition to channel guidance, the spectrum certificate may include a recommendation for a transmitted power limit of the radio system 48. The power limit recommendation may be established to maximize channel allocation and reducing potential interference under the theory that if the radio systems 48 collectively use less power, more radio systems 48 may make efficient use of the available spectrum.

With continued reference to FIG. 2, the radio system 48 may also communicate the transmitting and receiving channel selections to a peer radio system 50 during a link setup with the peer radio system 50. Following receipt of the transmitting and receiving channel selections 80, in block 82 the peer radio system 50 may be configured to communicate with the radio system 48. After the peer radio system has been configured to communicate with the radio system 82, in blocks 84 and 86 the radio system 48 and peer radio system 50 may then communicate over the transmitting and receiving channels.

The radio system 48 may select one of selected transmit operating channels to be a primary channel. Beacons and hello messages may be transmitted on the primary channel. The radio system 48 may periodically broadcast a list of the selected transmit channels in its beacon. The beacon also may contain a list of the selected receive channels. The list of selected transmit channels and/or the list of selected receive channels also may be sent to another device on demand.

Figure 3:
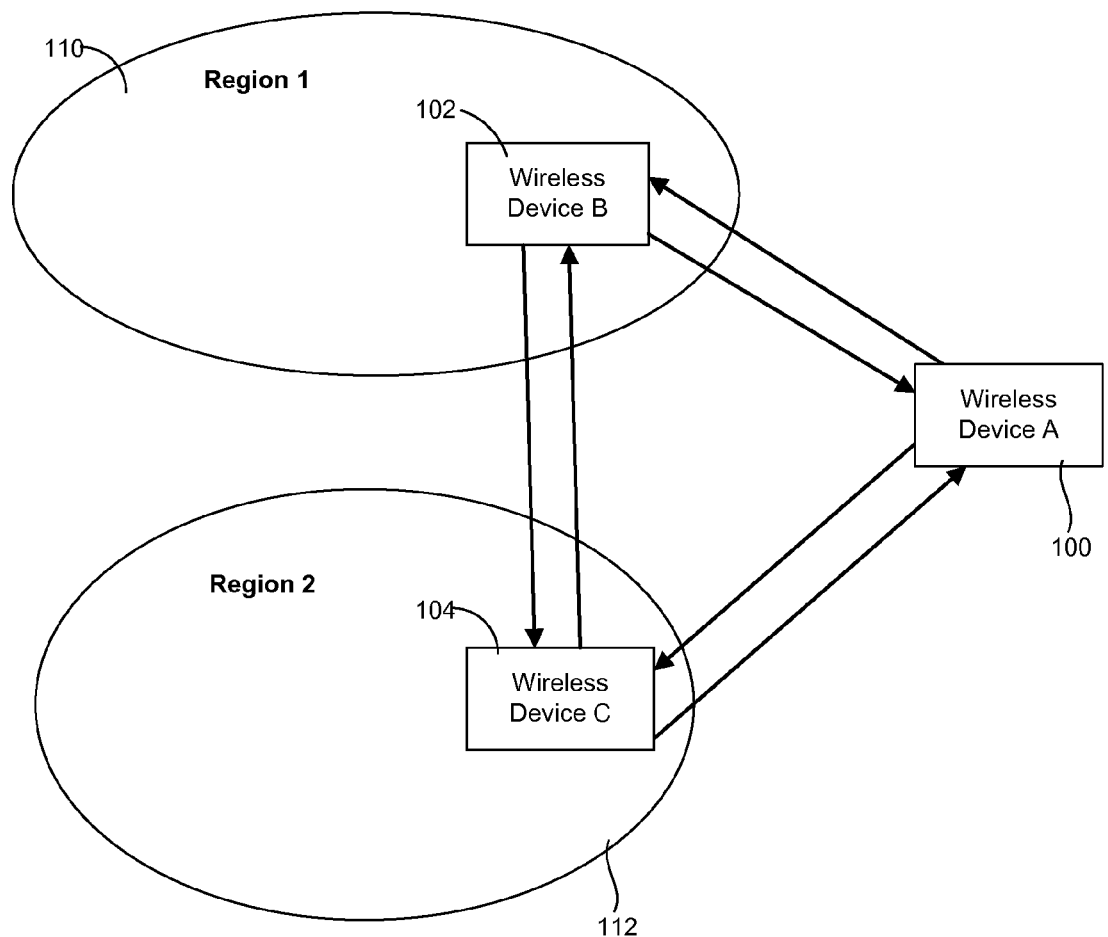
FIG. 3 is a schematic view of representative wireless devices present in regions with varying restrictions on transmitting and receiving wireless communications.

To illustrate an exemplary scenario in which a radio device may use a channel for reception that is unavailable for transmission, FIG. 3 shows three representative wireless devices: device A 100, device B 102, and device C 104. Device B 102 is located in a first region 1, where channel 1 is exclusively registered to a primary radio system. Device C 104 is located in a second region 112, where channel 1 and 2 are exclusively registered to primary radio systems. Device A 100 is located in a region where all channels are available for wireless communications. Restricted channels in the first region 110 and the second region 112 are unavailable for transmission by device B 102 and device C 106 respectively. In this example, device B 102 and device C 104 may attempt to wirelessly communicate with device A 100.

Figure 4:
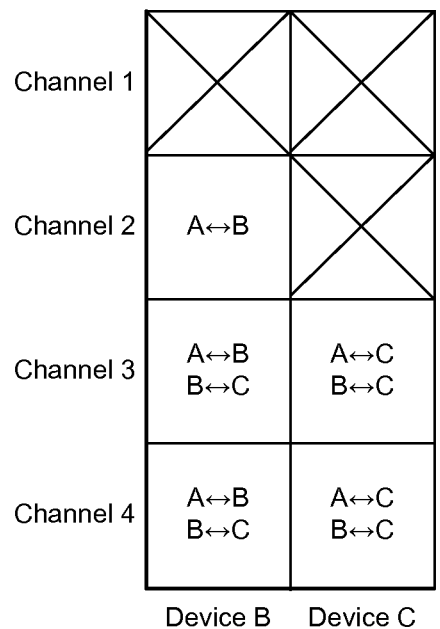
FIG. 4 is a chart representing channels available for transmission and receiving wireless communications under conventional spectrum management protocols.

The available channels for transmitting and receiving wireless communications utilizing conventional methods are shown in FIG. 4 for device B 102 and device C 104. The channels are identified on the y-axis and the device (device B and device C) are identified on the x-axis. Those channels marked with an "X" are those channels that are conventionally not available for wireless communication involving the corresponding radio device. Under the current state of the art, device B 102 would not be able to engage in wireless communications (transmit or receive) on channel 1. Similarly, device C 104 would not be able to engage in wireless communications (transmit or receive) on channel 1 or 2. The remaining blocks show the available channels for communications between devices A and B (indicated as A⇆B), devices A and C (indicated as A⇆C), and between devices B and C (indicated as B⇆C).

While device B 102 and device C 106 are prohibited from transmitting on the restricted channels to minimize causing interference with other radio systems, the Applicants of this patent application have come to appreciate that devices B and C are not prohibited from receiving wireless communications from another device (e.g., device A 100) on these conventionally available channels. Whether device A is permitted to transmit on channel 1 or channel 2 depends on the operating parameters of device A 100 and any nearby primary radio system. In other words, while transmissions from device B 102 and device C 104 on the restricted channels is prohibited, the operating parameters of device A 100 may allow for device B 102 and device C 102 to receive wireless communications on the restricted channels from device A 100. It is noted that directional and/or high gain antennas may be used to facilitate this transmission from a transmitting device that is located in remote enough proximity to the receiving device to not have transmit restrictions on the channel in question.

Figure 5:
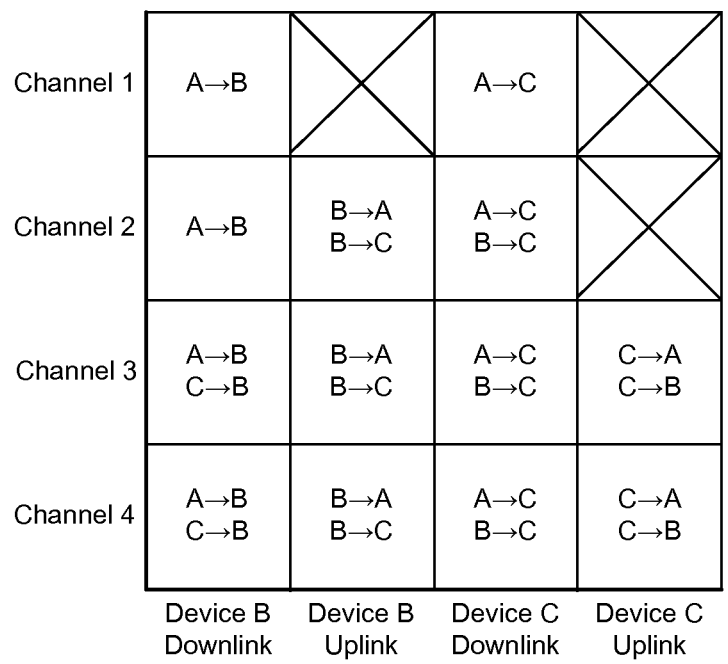
FIG. 5 is a chart representing channel availability for transmission and receiving wireless communications for the representative wireless devices of FIG. 3 when utilizing an improved spectrum management protocol.

FIG. 5 illustrates an exemplary chart of available channels separately for receive operations (also referred to as a device's downlink or DL) and for transmit operations (also referred to as a device's uplink or UL). As illustrated, an available channel map for transmission for device B 102 will not contain channel 1, as demonstrated in the corresponding upload (UL) column in FIG. 5. But an available channel map for reception for device B 102 may contain channel 1, as demonstrated in the corresponding download (DL) column. Similarly, an available channel map for transmission for device C 104 will not contain channels 1 and 2, as demonstrated in the corresponding upload (UL) column in FIG. 5. But an available channel map for reception for device C 104 may contain channels 1 and 2, as demonstrated in the corresponding download (DL) column. The remaining blocks show the available channels for communications from device A to device B (indicated as A→B), from device B to device A (indicated as B→A), from device A to device C (indicated as A→C), from device C to device A (indicated as C→A), from device B to device C (indicated as B→C), and from device C to device B (indicated as C→B).

The additional channels available for reception increases the available bandwidth for receiving wireless channel communications by a device in question, and increases the available bandwidth for transmissions by devices that may use those channels for transmissions to the device in question.

D. Link Selection

An advantage of using the normally unavailable channels for downlink reception purposes is the increased receive capability of a radio device. Many modern radio devices (e.g., mobile telephones) do not transmit large amounts of data on a regular basis. Rather, data is transmitted when needed to support activities such as voice communications, messaging, Internet browsing, etc. These devices are more prone to receive higher volumes of data, such as streaming audio or video, downloading files, etc. As such, the disclosed techniques are useful for devices with this type of usage profile and/or for other devices to increase available bandwidth for reception.

As an example, assume there are 10 total available channels for wireless communications numbered one through ten, and each channel is 6 megahertz (MHz) wide. Assume now that the registration system 12 a spectrum certificate returns to a radio device 48 indicating that channels 2, 3, 5, 6, and 7 are available for use. Assume further that the radio device 48 is capable of operating on or is currently configured to operate on channels 2, 3, 4, and 5. The radio device may therefore choose channels 2, 3, or 5 for transmitting in a 6 MHz transmit mode or may selected channels 2 and 3 for transmitting in a 12 MHz transmit mode, for example. Under the current state of the art, the radio device 48 is limited to receiving wireless signals on channels selected for transmission. Using the described techniques, the radio 48 would have the capability to receive wireless signals on all of the channels the radio device is capable of operating on (channels 2, 3, 4, and 5 in this prophetic example). Therefore, the radio device can receive wireless communications on channels 2, 3, 4, or 5 in a 6 MHz receive mode; channels 2 and 3, channels 3 and 4, or channels 4 and 5 in a 12 MHz receive mode; or channels 2, 3, 4, and 5 in a 24 MHz receive mode. As such, the downlink bandwidth options for the radio device 48 has increased.

In another embodiment, the radio device may not rely on a channel map provided by a registration system. For instance, for a radio that operates in radar bands (e.g., 5.4 GHz channels), the radio may be configured to detect radar transmissions by analyzing detected pulses. If the radio device detects a radar signal on a channel being used for transmission, the radar will vacate the channel for transmission purposes. But, under the disclosed techniques, the radio device may used the channel for receive purposes.

E. Conclusion

Although certain embodiments have been shown and described, it is understood that equivalents and modifications falling within the scope of the appended claims will occur to others who are skilled in the art upon the reading and understanding of this specification.

What is claimed is:

1. A wireless radio device, comprising:
 a wireless transceiver configured to receive on a first channel set and transmit on a second channel set; and
 a control circuit configured to:
  determine one or more available channels for transmission;
  select one or more channels for the second channel set from the channels available for transmission, the one or more channels for the second channel set being operational channels for an uplink of the radio device;
  determine one or more available channels for reception, the one or more available channels for reception including the one or more available channels for transmission and one or more channels that are not available for transmission due to operation of an incumbent radio device in a location of the radio device; and
  select one or more channels for the first channel set from the channels available for reception, the one or more channels for the first channel set being operational channels for a downlink of the radio device wherein determination of the one or more available channels for transmission and the one or more available channels for reception is carried out by transmission of a registration request to a registration system and reception of a spectrum certificate with a channel map of available channels for wireless communications from the registration system.

2. The radio device of claim 1, wherein the first channel set and the second channel set have at least one channel in common.

3. The radio device of claim 1, wherein the one or more channels for the first and second channel sets are selected so that a receive bandwidth mode of the radio device has a bandwidth that is larger than a bandwidth of a transmit bandwidth mode of the radio device.

4. The radio device of claim 1, wherein the control circuit is further configured to select a primary channel that is in both the first and second channel sets.

5. The radio device of claim 1, wherein the radio device is configured to communicate the operational channels for the uplink and downlink to another radio device.

6. The radio device of claim 5, wherein the operational channels are communicated during a link set up for communications with the another radio device.

7. The radio device of claim 5, wherein the operational channels are communicated in a beacon transmitted by the radio device.

8. The radio device of claim 1, wherein the control circuit is configured to analyze the spectrum certificate to select the one or more channels for the first and second channel sets.

9. The radio device of claim 8, wherein the channel map contains a channel map of available channels without distinction between receive and transmit operations.

10. The radio device of claim 8, wherein the spectrum certificate contains one channel map of available channels for transmit and another channel map of available channels for reception.

11. The radio device of claim 1, wherein the radio device is configured to communicate the operational channels for the uplink and the downlink to the registration system.

12. A method of configuring a wireless radio device that has a wireless transceiver configured to receive on a first channel set and transmit on a second channel set, comprising:
   determining one or more available channels for transmission;
   selecting one or more channels for the second channel set from the channels available for transmission, the one or more channels for the second channel set being operational channels for an uplink of the radio device;
   determining one or more available channels for reception, the one or more available channels for reception including the one or more available channels for transmission and one or more channels that are not available for transmission due to operation of an incumbent radio device in a location of the radio device; and
   selecting one or more channels for the first channel set from the channels available for reception, the one or more channels for the first channel set being operational channels for a downlink of the radio device wherein determination of the one or more available channels for transmission and the one or more available channels for reception is carried out by transmitting a registration request to a registration system and receiving a spectrum certificate with a channel map of available channels for wireless communications from the registration system.

13. The method of claim 12, wherein the first channel set and the second channel set have at least one channel in common.

14. The method of claim 12, wherein the one or more channels for the first and second channel sets are selected so that a receive bandwidth mode of the radio device has a bandwidth that is larger than a bandwidth of a transmit bandwidth mode of the radio device.

15. The method of claim 12, further comprising selecting a primary channel that is in both the first and second channel sets.

16. The method of claim 12, further comprising communicating the operational channels for the uplink and downlink to another radio device.

17. The method of claim 16, wherein the operational channels are communicated during a link set up for communications with the another radio device.

18. The method of claim 16, wherein the operational channels are communicated in a beacon transmitted by the radio device.

19. The method of claim 12, further comprising analyzing the spectrum certificate to select the one or more channels for the first and second channel sets.

20. The method of claim 19, wherein the channel map contains a channel map of available channels without distinction between receive and transmit operations.

21. The method of claim 19, wherein the spectrum certificate contains one channel map of available channels for transmit and another channel map of available channels for reception.

22. The method of claim 12, further comprising communicating the operational channels for the uplink and the downlink to the registration system.

23. A registration system for radio systems that use spectrum that is interleaved with spectrum used by incumbent radio systems, comprising:
   an interface to communicate with the radio systems over a network; and
   a processor that executes a spectrum allocation function that is stored in a memory and, by execution of the spectrum allocation function, the registration system configured to:
      receive a registration request from a requesting radio device; and
      generate a spectrum certificate for the requesting radio device, the spectrum certificate containing:
         a first channel map identifying available channels for use by the requesting radio device for transmission of radio signals to other radio devices; and
         a second channel map identifying available channels for use by the requesting radio device for receiving radio signals from the other radio devices, the second channel map including one or more channels that are not available for transmission due to operation of an incumbent radio device in a location of the requesting radio device.

24. The registration system of claim 23, where the registration system is further configured to:
   select one or more channels from the channels available for transmission for the requesting radio device to use as operational channels for an uplink of the requesting radio device; and
   select one or more channels from the channels available for reception for the requesting radio device to use as operational channels for a downlink of the requesting radio device.

25. The registration system of claim 24, wherein the selected channels for the uplink and the downlink are for establishment of a peer link setup between the requesting radio device and another radio device.

* * * * *